United States Patent
Bliven et al.

(10) Patent No.: US 9,274,245 B2
(45) Date of Patent: Mar. 1, 2016

(54) MEASUREMENT TECHNIQUE UTILIZING NOVEL RADIATION DETECTORS IN AND NEAR PULSED NEUTRON GENERATOR TUBES FOR WELL LOGGING APPLICATIONS USING SOLID STATE MATERIALS

(71) Applicants: Steven M. Bliven, Magnolia, TX (US); Maxim Vasilyev, The Woodlands, TX (US); Toyli Anniyev, The Woodlands, TX (US)

(72) Inventors: Steven M. Bliven, Magnolia, TX (US); Maxim Vasilyev, The Woodlands, TX (US); Toyli Anniyev, The Woodlands, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 131 days.

(21) Appl. No.: 14/291,771

(22) Filed: May 30, 2014

(65) Prior Publication Data
US 2015/0346382 A1    Dec. 3, 2015

(51) Int. Cl.
G01V 5/10    (2006.01)
G01V 5/06    (2006.01)

(52) U.S. Cl.
CPC . *G01V 5/102* (2013.01); *G01V 5/06* (2013.01)

(58) Field of Classification Search
CPC ............ G01V 5/10; G01V 5/102; G01V 5/06
USPC ....................................... 250/269.1, 253, 262
See application file for complete search history.

(56) References Cited

U.S. PATENT DOCUMENTS 4,387,302 A * 6/1983 Givens .................... G01V 5/102
                                                    250/253
4,786,796 A 11/1988 Flaum et al.
(Continued)

FOREIGN PATENT DOCUMENTS

WOWO2008US732282008    8/2008

OTHER PUBLICATIONS

Haughton, "3D Diamond Detectors", The University of Manchester, particle Physics 9th Trento Workshop, Feb. 18, 2013, 29 pages.
(Continued)

*Primary Examiner* — Yara B Green
(74) *Attorney, Agent, or Firm* — Cantor Colburn LLP (57) ABSTRACT

An apparatus for estimating a property of an earth formation includes a pulsed neutron generator configured to emit a pulse of neutrons, a formation radiation detector configured to detect radiation emitted from the formation due to interactions with the pulse of neutrons, and a neutron generator radiation detector having a crystal structure and configured to detect a radiation particle emitted from the pulsed neutron generator and to provide a location within the neutron radiation detector at which the particle was detected. The crystal structure includes a plurality of detection cells, each detection cell having at least two electrically conducting columns with an applied potential difference such that electrons generated in the crystal structure by interaction with the radiation particle are collected by at least one of the electrically conducting columns to provide detection locations. A processor estimates the property using the detected formation radiation and the detection locations.

22 Claims, 4 Drawing Sheets

(56) References Cited

U.S. PATENT DOCUMENTS

| | | | |
|---|---|---|---|
| 5,212,385 A | 5/1993 | Jones | |
| 6,297,507 B1 | 10/2001 | Chen et al. | |
| 6,645,789 B2 | 11/2003 | Bernstein et al. | |
| 6,828,561 B2 | 12/2004 | Layman et al. | |
| 7,368,723 B2 | 5/2008 | Whitehead et al. | |
| 8,242,455 B2 | 8/2012 | Whitehead et al. | |
| 8,338,777 B2 | 12/2012 | Nikitin et al. | |
| 8,492,723 B2 | 7/2013 | Groiselle et al. | |
| 8,586,939 B2 | 11/2013 | Bingham et al. | |
| 2005/0135533 A1 | 6/2005 | Le Tourneur | |
| 2007/0241275 A1* | 10/2007 | Guo | G01V 5/101 250/269.1 |
| 2009/0045329 A1 | 2/2009 | Stoller et al. | |
| 2009/0057545 A1* | 3/2009 | Saenger | G01V 5/04 250/269.4 |
| 2010/0025594 A1* | 2/2010 | Nukatsuka | G01T 3/00 250/370.11 |
| 2010/0193676 A1* | 8/2010 | Jacobson | G01V 5/102 250/269.6 |
| 2010/0282976 A1 | 11/2010 | Le Tourneur et al. | |
| 2011/0062319 A1 | 3/2011 | Nikitin et al. | |
| 2011/0198488 A1* | 8/2011 | Stoller | G01V 5/102 250/258 |
| 2011/0260044 A1 | 10/2011 | Wraight et al. | |
| 2012/0043966 A1* | 2/2012 | Montaron | G01V 5/104 324/324 |
| 2012/0175526 A1* | 7/2012 | Seo | H01J 47/02 250/423 R |

OTHER PUBLICATIONS

Mitra, Sudeep, "Identification of UXO using the Associated Particle Neturon Time-of-Flight Technique", SERDP Project MR-1769, Aug. 2011, 42 pages.

Nikitin, et al., "Needs of well logging industry in new nuclear detectors", Nov. 3, 2010, 6 pages.

Piazzza, et al., "Design and Evaluation of a Reconfigurable Antenna Array for MIMO Systems", IEEE Transactions on Antennas and Propagation, vol. 56, No. 3, Mar. 2008, pp. 869-881.

* cited by examiner

MEASUREMENT TECHNIQUE UTILIZING NOVEL RADIATION DETECTORS IN AND NEAR PULSED NEUTRON GENERATOR TUBES FOR WELL LOGGING APPLICATIONS USING SOLID STATE MATERIALS

BACKGROUND

Geologic formations may be used for many purposes such as hydrocarbon production, geothermal production, or carbon dioxide sequestration. Typically, boreholes are drilled into the formations to provide access to them. Various downhole tools may be conveyed in the boreholes in order to characterize the formations. Characterization of the formations and the fluids within them provides valuable information related to the intended use of the formations so that drilling and production resources can be used efficiently.

One type of downhole tool is a neutron tool that may be used to measure a property such as porosity of an earth formation. The neutron tool bombards the formation with neutrons either continuously from a chemical source or as a pulse from an electronic source. The neutrons interact with the formation to produce radiation that is detected by a gamma-ray detector. The output of the gamma-ray detector is then correlated to the formation property. Unfortunately, similar radiation may be present due to factors other than neutron bombardment of formations and this radiation may cause a decrease in accuracy of the measurements. Hence, it would be well appreciated in the drilling industry if measurement techniques were developed that would improve the measurement accuracy of neutron tools.

BRIEF SUMMARY

Disclosed is an apparatus for estimating a property of an earth formation. The apparatus includes: a pulsed neutron generator configured to emit a pulse of neutrons, the pulsed neutron generator being disposed on a carrier configured to be conveyed through a borehole penetrating the earth formation; a formation radiation detector configured to detect radiation emitted from the formation due to interactions with the pulse of neutrons; a neutron generator radiation detector that includes a crystal structure and configured to detect a radiation particle emitted from the pulsed neutron generator and to provide a location within the neutron radiation detector at which the particle was detected, the crystal structure includes a plurality of detection cells, each detection cell having at least two electrically conducting columns with an applied potential difference such that electrons generated in the crystal structure by interaction with the radiation particle emitted by the pulse neutron generator are collected by at least one of the electrically conducting columns, wherein the detection cell detecting the radiation particle provides the location; and a processor configured to estimate the property using the radiation detected by the formation radiation detector and locations of radiation particles detected by the neutron generator radiation detector.

Also disclosed is another apparatus for estimating a property of an earth formation. This apparatus includes: a pulsed neutron generator configured to emit a pulse of neutrons, the pulsed neutron generator being disposed on a carrier configured to be conveyed through a borehole penetrating the earth formation; a formation radiation detector configured to detect radiation emitted from the formation due to interactions with the pulse of neutrons; a neutron generator radiation detector that includes a crystal structure, and configured to detect a radiation particle emitted from the pulsed neutron generator and to provide a location within the neutron generator radiation detector at which the particle was detected, the crystal structure includes a plurality of detection cells, each detection cell having at least two electrically conducting columns with an applied potential difference such that electrons generated in the crystal structure by interaction with the radiation particle emitted by the pulse neutron generator are collected by at least one of the electrically conducting columns, wherein the detection cell detecting the radiation particle provides the location; a voltage source coupled to the at least two conducting columns and configured to apply the potential difference between the at least two conducting columns; a coincidence counter coupled to the formation radiation detector and to the neutron generator radiation detector and configured to identify formation radiation counts that are detected by the formation radiation detector and are within a defined time interval that starts with detection of an associated radiation particle that was emitted by the pulsed neutron generator; electronics coupled to the at least two conducting columns and configured to estimate a trajectory of neutrons emitted from the pulsed neutron generator; and a processor configured to estimate the property using the formation radiation counts identified by the coincidence counter and locations of radiation particles detected by the neutron generator radiation detector; wherein the processor is further configured to not use formation radiation counts identified by the coincidence counter that are associated with the trajectory if the trajectory does not intersect with the formation in a region of interest.

Further disclosed is a method for estimating a property of an earth formation. The method includes: conveying a carrier through a borehole penetrating the formation; emitting a pulse of neutrons from a pulsed neutron generator disposed on the carrier; detecting formation radiation emitted from the formation due to interactions with the pulse of neutrons using a formation radiation detector; detecting radiation emitted from the pulsed neutron generator using a neutron generator radiation detector that includes a crystal structure and configured to detect a radiation particle emitted from the pulsed neutron generator and to provide a location within the neutron radiation detector at which the particle was detected, the crystal structure including a plurality of detection cells, each detection cell having at least two electrically conducting columns with an applied potential difference such that electrons generated in the crystal structure by interaction with the radiation particle emitted by the pulse neutron generator are collected by at least one of the electrically conducting columns, wherein the detection cell detecting the radiation particle provides the location; identifying formation radiation counts detected by the formation radiation detector within a defined time interval that starts with detection of an associated radiation particle that was emitted by the pulsed neutron generator along with a neutron using a coincidence counter; and estimating, using a processor, the property using the formation radiation counts identified by the coincidence counter and locations of radiation particles detected by the neutron generator radiation detector.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are embodiments of apparatus and method for improving the accuracy of measurements of a property of an earth formation that is bombarded with neutrons. The accuracy is improved by detecting neutrons emitted by a pulsed-neutron generator and coincidence counting detected radiation particles or rays from the formation due to the bombardment in order to exclude the counting of radiation due to other factors such as gamma-rays generated by neutron interactions in a toll body, borehole constructions, borehole fluids, as well as naturally occurring gamma-rays and gamma-rays generated through neutron capture and activation events.

Figure 1:
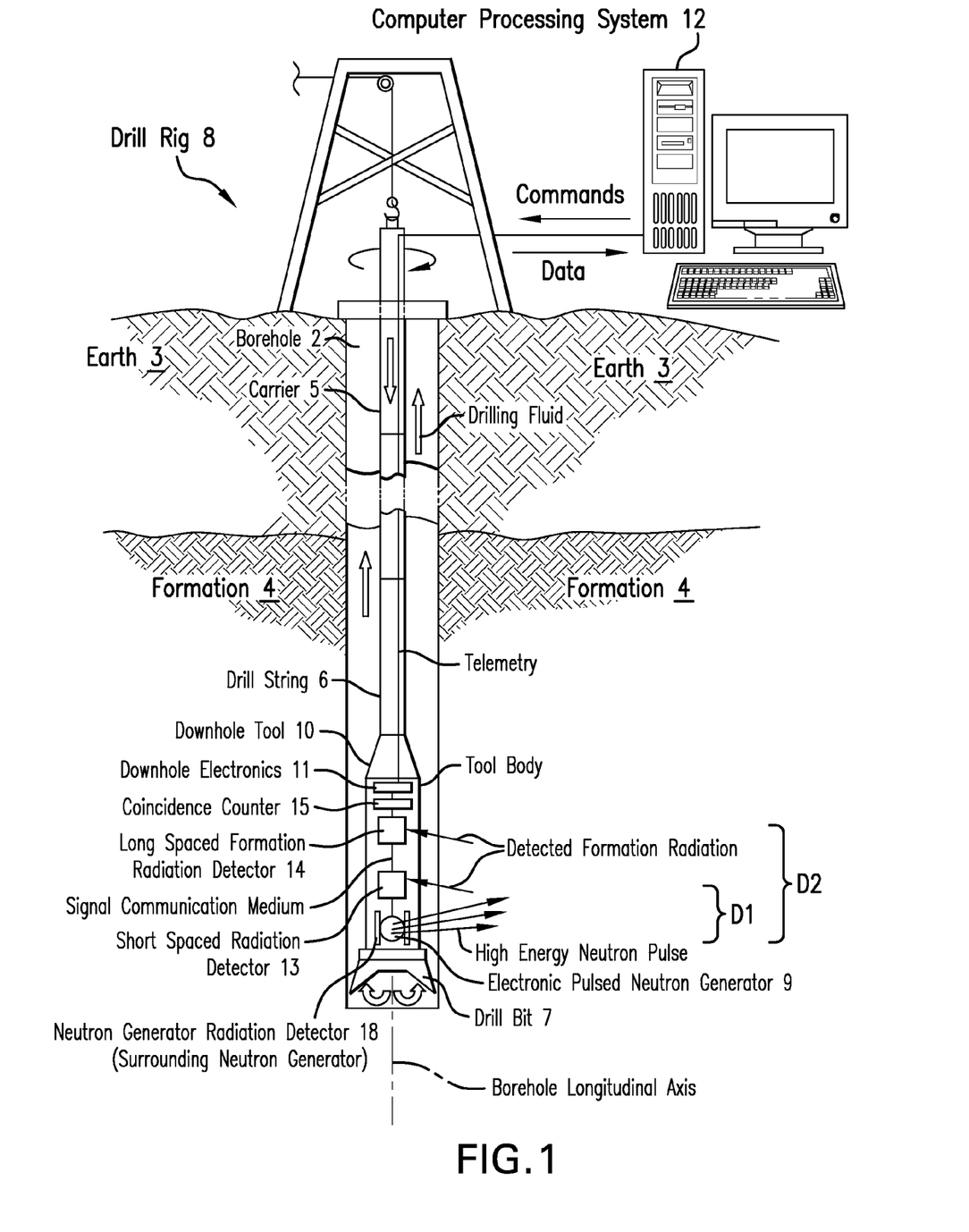
FIG. 1 illustrates a cross-sectional view of an exemplary embodiment of a neutron tool disposed in a borehole penetrating the earth.

Apparatus for implementing the teachings is now discussed with reference to FIG. 1. In FIG. 1, a cross-sectional view is illustrated of an exemplary embodiment of a downhole neutron tool 10 disposed in a borehole 2 penetrating the earth 3, which may include an earth formation 4. The formation 4 represents any subsurface material of interest (including fluids) that may be sensed by the tool 10. The downhole tool 10 is conveyed through the borehole 2 by a carrier 5, which can be a drill tubular such as a drill string 6. A drill bit 7 is disposed at the distal end of the drill string 6. A drill rig 8 is configured to conduct drilling operations such as rotating the drill string 6 and thus the drill bit 7 in order to drill the borehole 2. In addition, the drill rig 8 is configured to pump drilling fluid through the drill string 6 in order to lubricate the drill bit 7 and flush cuttings from the borehole 2. Downhole electronics 11 are configured to operate the downhole tool 10, process measurement data obtained downhole, and/or act as an interface with telemetry to communicate data or commands between downhole components and a computer processing system 12 disposed at the surface of the earth 3. Non-limiting embodiments of the telemetry include pulsed-mud and wired drill pipe. System operation and data processing operations may be performed by the downhole electronics 11, the computer processing system 12, or a combination thereof. The downhole tool 10 may be operated continuously as the borehole is being drilled or at discrete selected depths in the borehole 2. In an alternative embodiment referred to as wireline logging, the carrier 5 may be an armored wireline, which can also provide communications with the processing system 12.

The downhole tool 10 includes an electronic pulsed neutron generator (PNG) 9 that is configured to emit a pulse of high energy (about 14 MeV) neutrons into the formation 4 during a time interval in which the PNG 9 is "on." (When the PNG 9 is "off," the neutron pulse is terminated and high energy neutrons are no longer emitted.) The pulse may relate to a constant emission rate of neutrons while the PNG 9 is on. The emitted neutrons bombard the formation in a region of interest and interact with the formation nuclei in the region of interest to produce formation radiation by various processes such as inelastic scattering.

The downhole tool 10 further includes a short spaced formation radiation detector 13 spaced a first distance D1 (e.g., about 15 inches) from the PNG 9 and a long spaced formation radiation detector 14 spaced a second distance D2 (e.g., about 22 inches) from the PNG 9 that is longer that the first distance D1 (i.e., D2>D1). The formation radiation detectors are configured to detect the formation radiation produced in the formation by the bombardment of the neutrons in the neutron pulse. The formation radiation may include gamma-rays, neutrons, or some combination thereof. Detecting formation radiation may include counting radiation particles or rays, measuring the energy of each detected particle or ray, and/or measuring the time of detection with respect to the time of the neutron pulse. Thus, the formation radiation detectors can acquire data that can be used to provide a time spectrum and/or an energy spectrum. Each of the formation radiation detectors 13 and 14 is configured to generate a count upon detection of a radiation particle or ray where the count is represented by a signal that is received by electronics discussed below.

Various indicators are used to analyze formation detection data from the tool to facilitate estimation of various formation properties. An exemplary indicator is a "RIN13" indicator, which is the ratio of gamma-rays from fast neutron inelastic scattering interactions detected by the short spaced detector 13 to the gamma-rays from inelastic scattering interactions detected by the long spaced detector 14. Alternatively, gamma-ray counts or neutron counts from only one formation radiation detector may be used to provide an indicator. Using the various indicators, the porosity or other properties of the formation may be estimated using data analysis techniques that are known in the art.

Surrounding the PNG 9 is a neutron generator radiation detector 18 that is configured to detect radiation emitted by the PNG 9. The radiation includes neutrons as discussed above and alpha particles, which are products of a Deuterium-Tritium (D-T) fusion reaction. The PNG 9 includes components that produce a D-T reaction in order to generate the neutron pulse. Detection of alpha particles can be distinguished from the detection of neutrons or other particles by the amount of energy deposited by the detected particle. The amount of energy associated with the detected particle of interest may be determined by analysis or calibration of the neutron generator radiation detector 18 for different types of particles of interest that may be detected. Accordingly, in one or more embodiments, the neutron generator radiation detector 18 may be coupled to a discriminator circuit that is configured to discriminate against energy levels of other particles that may not be of interest such that only detected particles of interest provide a detection count. The discriminator circuit may be implemented by the downhole electronics 11.

Still referring to FIG. 1, a coincidence counter 15 is coupled to the formation radiation detectors 13 and 14 and to the neutron generator radiation detector 18. The coincidence counter 15 includes electronic circuitry that is configured to determine if a formation radiation particle or ray detected by the formation radiation detector 13 or 14 is detected within a defined time interval that starts with the detection of an alpha particle or neutron by the neutron generator radiation detector 18. If the formation radiation particle or ray is detected within the defined time interval (e.g., from two to three nanoseconds and potentially up to 100 ns), then the coincidence counter identifies the count provided by the detector 13 or 14 as being valid. The validated counts are used to estimate a property of interest of the formation.

Figure 2A:
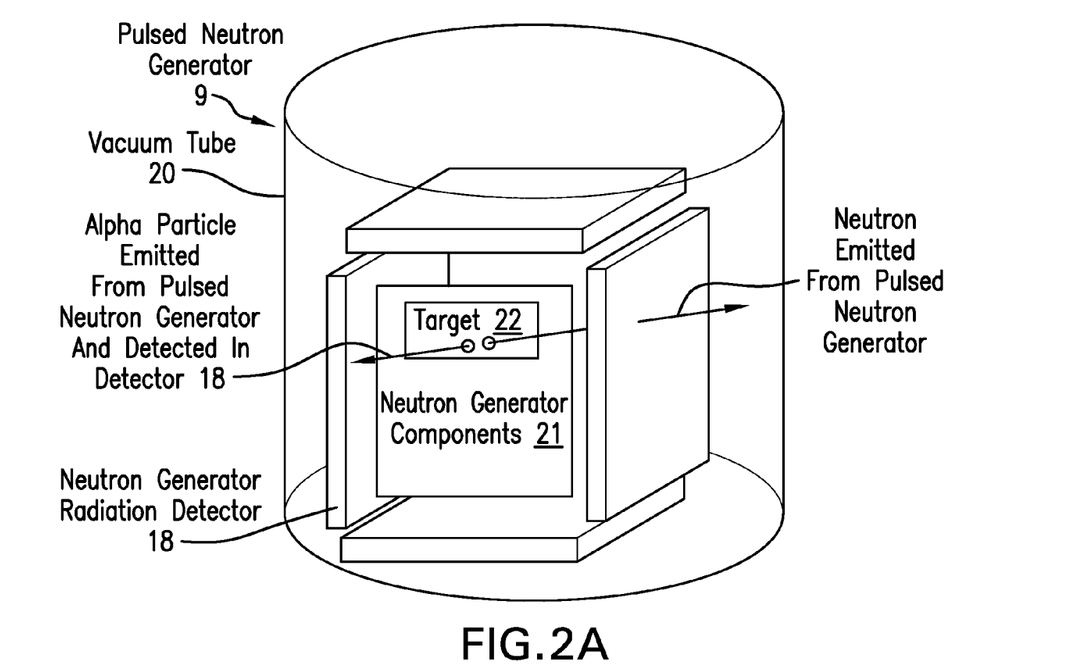
FIGS. 2A and 2B, collectively referred to as FIG. 2, depict aspects of a pulsed-neutron generator and radiation detectors disposed in the neutron tool.
Figure 2B:
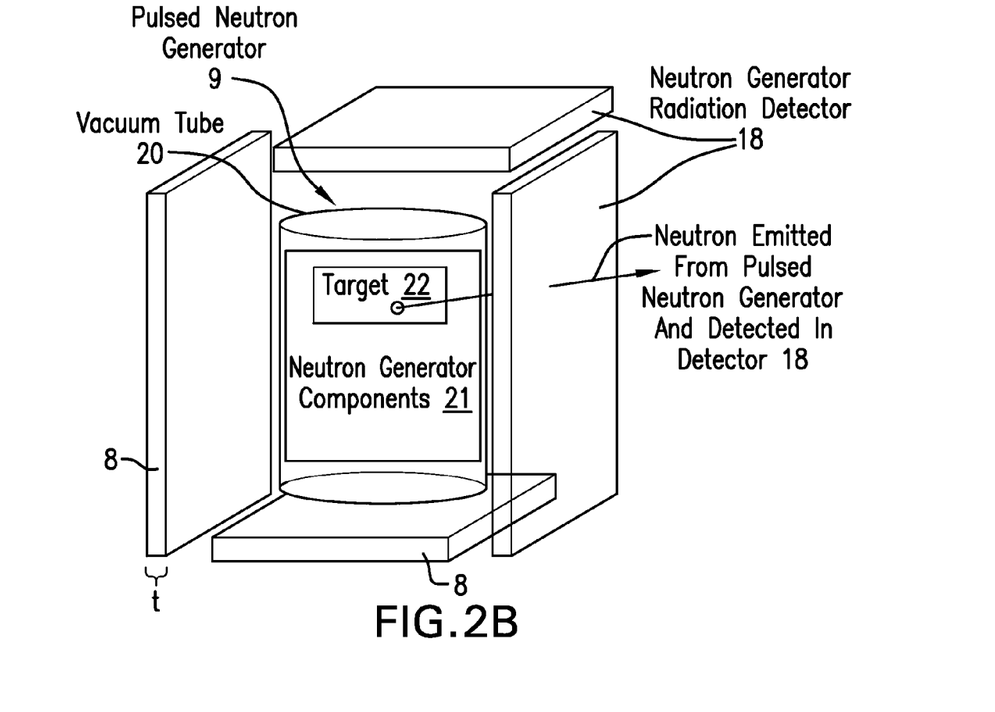

Refer now to FIG. 2, which depicts aspects of the PNG 9. The PNG 9 includes neutron generator components 21 for producing the D-T fusion reaction, which produces a neutron and an alpha particle where the alpha particle travels in a direction opposite to the direction of travel of the neutron in accordance with the conservation of momentum. The components 21, which include a target 22 that emits the neutron, are disposed in a vacuum tube 20. In one or more embodiments, the neutron generator radiation detector 18 is disposed within the vacuum tube 20 as illustrated in FIG. 2A. In this embodiment, the neutron generator radiation detector 18 is configured to detect alpha particles. The detection of alpha particles is related to the detection of the associated neutron that was produced when the alpha particle was produced. Alternatively, the neutron generator radiation detector 18 may be disposed external to the vacuum tube 20 as illustrated in FIG. 2B. In this embodiment, the neutron generator radiation detector 18 is configured to detect neutrons since the alpha particles produced by the D-T reaction will be stopped inside the vacuum tube 20. The neutron generator radiation detector 18 can completely, substantially (i.e., cover greater than 90% of a two dimensional or three dimensional perimeter) or partially surround the neutron generator components 21 in either two or three dimensions. For illustration purposes, not all neutron generator radiation detectors 18 are shown. It can be appreciated that the configuration illustrated in FOG. 2 is only one example and that other configurations may be used.

It can be appreciated that the flight path of emitted neutrons can be determined using detection data acquired by the radiation detector 18. For example, the flight path the alpha particle traveled may be determined knowing the alpha particle was born at the target 22 and traveled in a straight line to a region, referred to as a detector cell, in the radiation detector 18 where the alpha particle was detected. The flight path of the associated neutron can also be determined knowing that it is opposite of the flight path of the alpha particle. The neutron flight path determined directly when the radiation detector 18 is external to the vacuum tube 20 can also be used to check neutron generator output isotropicity (i.e., same output intensity in all directions) particularly over the primary regions of interest in the formation for investigation. A measurement of deviation of neutron output isotropicity that exceeds a threshold value may call for applying a correction factor to a measured formation property value if the isotropicity deviation indicates excessive neutron output is directed into the borehole along the borehole longitudinal axis or into the tool body of the downhole tool. A correction factor may be determined by testing the tool or similar tools with known isotropicity deviations in formations with known formation property values either in the field or in a laboratory or, alternatively, by analysis.

Figure 3:
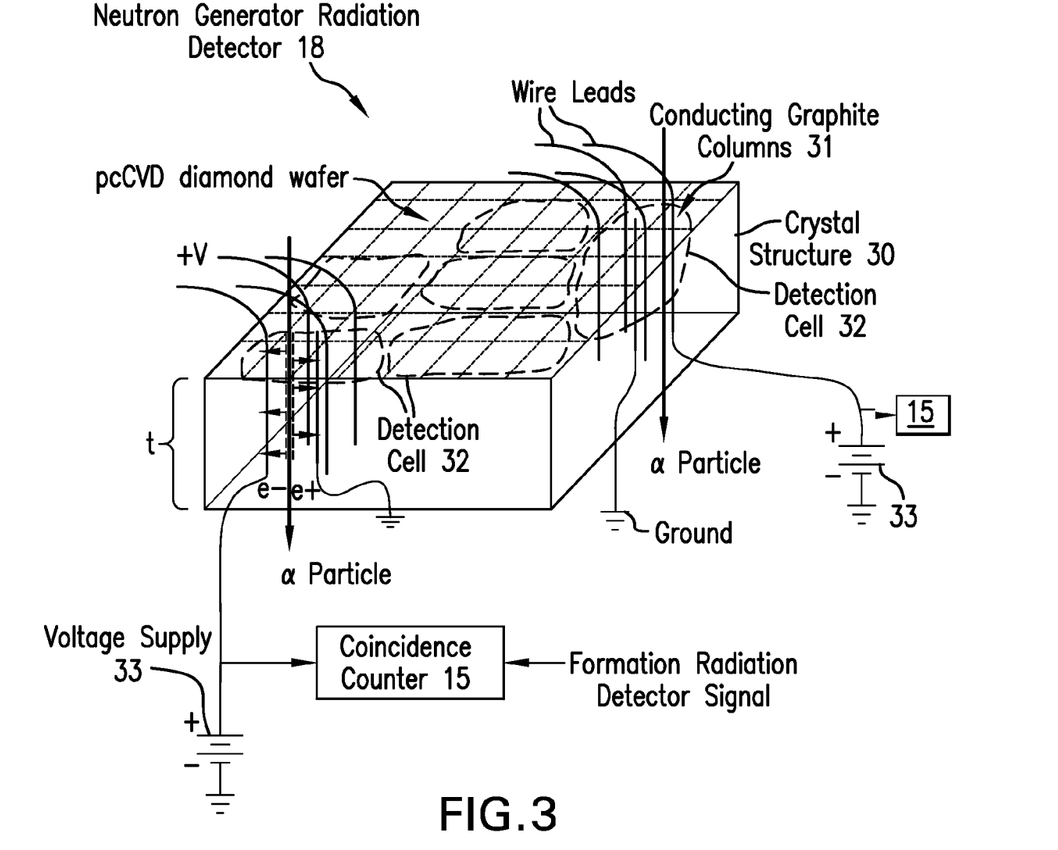
FIG. 3 depicts aspects of a plurality of radiation detector cells in a crystal structure.

Refer now to FIG. 3, which depicts aspects of the radiation detector 18. The radiation detector 18 includes a crystal structure 30 that may be a single crystal or polycrystalline. Polycrystalline diamond wafers are commercially available in larger plates of about 20×20 mm or more, having thickness t, while single crystal diamond is available in smaller sizes of about 4.5×4.5 mm. In one or more embodiments, the crystalline structure 30 is a polycrystalline diamond wafer that is fabricated by a chemical vapor deposition (CVD) process. Alternatively, the crystal structure 30 may be made of silicon carbide. An array of conducting graphite columns 31 is disposed in the crystal structure 30. The array of conducting columns 31 may be arranged into a plurality of detection cells 32 such that it can be determined which detection cell 32 has detected a radiation particle. Each detection cell 32 defines a region (two or three dimensional) in the crystal structure 30 in which an incoming particle can be detected. In the embodiment of FIG. 3, a voltage is applied to a plurality of columns 31 (using a voltage supply 33) with respect to one column that is grounded. In embodiments where the radiation detector 18 is installed inside of the vacuum tube 20, the alpha particle generated by the D-T reaction will enter the crystal structure and produce electron-hole pairs through a volume of the crystal structure. Due to the applied voltage and resulting potential difference, the produced electrons will be collected by one or more of the nearby conducting columns 31 to produce an electrical signal in the one or more columns. The electrical signal may be received by the coincidence counter, which will determine the region in the crystalline structure (i.e., coordinate detection) where the alpha particle was detected and when the alpha particle was detected in order to the start the time interval for coincidence counting. It can be appreciated that different voltage biasing schemes may be implemented such as having the voltage applied to one graphite column that is surrounded by several grounded graphite columns. The conducting columns may be fabricated using solid-state electronic fabrication techniques such as ion implantation or laser firing for highly localized disruption of crystal cell elemental ordering such as of CVD material.

The mean free path of charge carriers in diamond is on the order of about 50 microns, so only a few conducting columns closest to the track or trajectory of the alpha particle will produce an electric signal. Any other alpha particle passing simultaneously through the diamond crystalline structure will be detected if it hits the array within a few hundred microns from the first alpha particle. Additionally, the radiation detector detects the alpha particle and produces the electric signal very fast on the order of one to three nanoseconds and, thus, conducting columns near the alpha particle trajectory will be ready to detect the next alpha particle after just a few nanoseconds. It can be appreciated that the above discussion with respect to alpha particles detected within the vacuum tube 20 is also applicable to the detection of neutrons outside of the vacuum tube 20.

Figure 4:
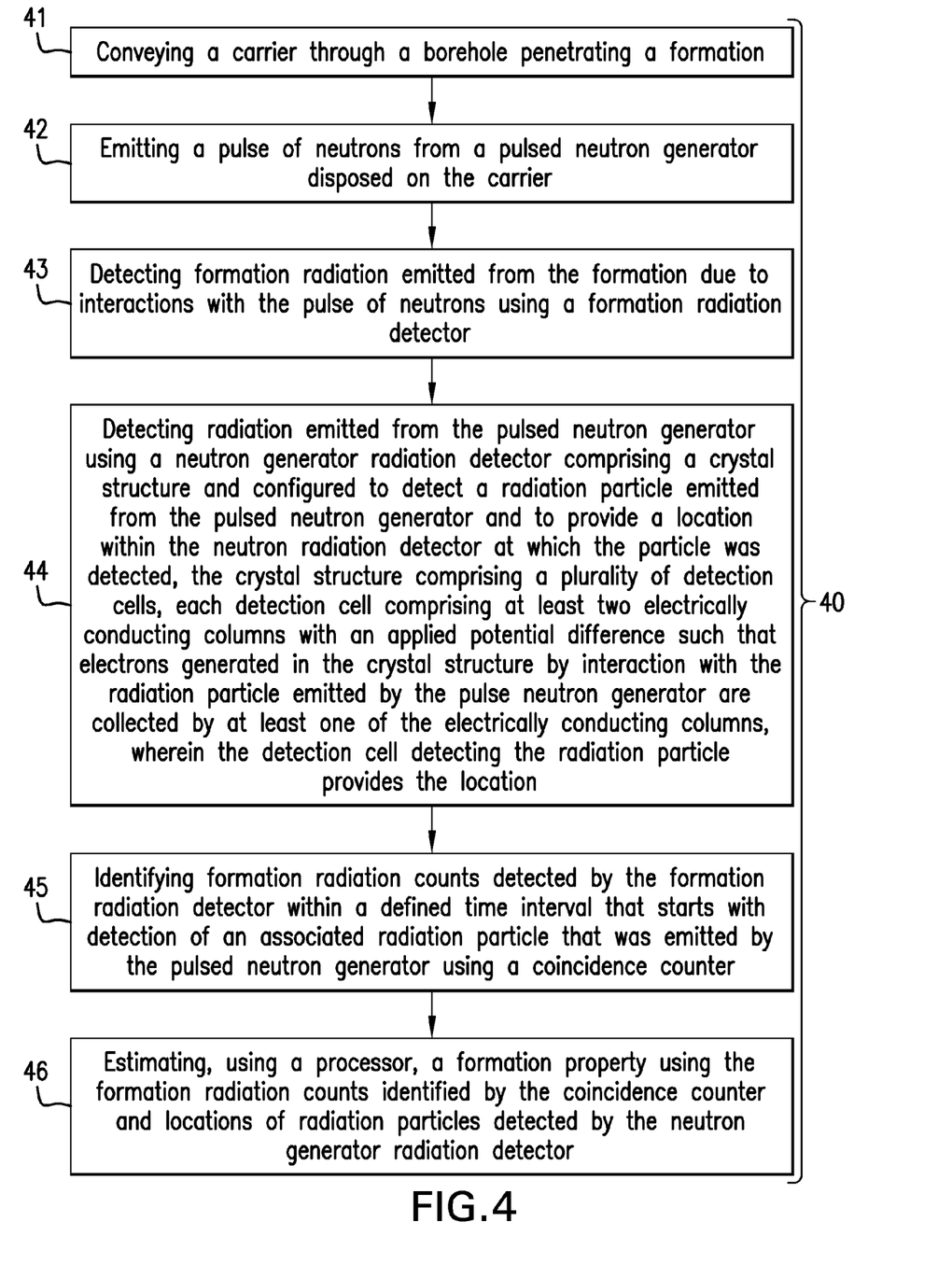
FIG. 4 is flow chart for a method for estimating a property of an earth formation penetrated by a borehole.

FIG. 4 is a flow chart for a method 40 for estimating a property of an earth formation. Block 41 calls for conveying a carrier through a borehole penetrating the formation. Block 42 calls for emitting a pulse of neutrons from a pulsed neutron generator disposed on the carrier. Block 43 calls for detecting formation radiation emitted from the formation due to interactions with the pulse of neutrons using a formation radiation detector. Block 44 calls for detecting radiation emitted from the pulsed neutron generator using a neutron generator radiation detector comprising a crystal structure and configured to detect a radiation particle emitted from the pulsed neutron generator and to provide a location within the neutron radiation detector at which the particle was detected. The crystal structure includes a plurality of detection cells with each detection cell having at least two electrically conducting columns with an applied potential difference such that electrons generated in the crystal structure by interaction with the radiation particle emitted by the pulse neutron generator are collected by at least one of the electrically conducting columns. By identifying the detection cell detecting the radiation particle and knowing the location of that detection cell, the location of the detection can be determined. Block 45 calls for identifying formation radiation counts detected by the formation radiation detector within a defined time interval that starts with detection of an associated radiation particle that was emitted by the pulsed neutron generator using a coincidence counter. Block 46 calls for estimating, using a processor, the property using the formation radiation counts identified by the coincidence counter and locations of radiation particles detected by the neutron generator radiation detector.

The method 40 may also include estimating a trajectory of a neutron emitted from the pulsed neutron generator by identifying the detection cell that detected an alpha particle that was emitted with the neutron by the pulsed neutron generator. The trajectory may be estimated from a straight line that includes one point in or on a target in the neutron generator that emits the neutron and one point in the detection cell that detected an alpha particle associated with the emission of the neutron. The method 40 may also include not using formation radiation counts identified by the coincidence counter that are associated with the trajectory if the trajectory does not intersect with the formation in a region of interest. In other words, formation counts associated with a trajectory that goes through the tool body or through the borehole without intersecting the formation in a region of interest (e.g., the trajectory is parallel to the borehole longitudinal axis) are used. The method 40 may also include applying a correction factor to radiation values measured by the formation radiation detector when locations of neutrons detected by the neutron generator radiation detector indicate a deviation from isotropicity beyond a threshold value. The method 40 may also include identifying alpha particles using an energy discriminator coupled to the neutron generator radiation detector, the energy discriminator being configured to identify the alpha particles by a level of energy of detected particles.

The above disclosed neutron generator radiation detector and associated apparatus provide several advantages. One advantage is that the neutron generator radiation detector is made of solid-state materials having a low vapor pressure that enables this detector to be disposed and operable within a vacuum tube. Another advantage of the use of solid-state materials for the neutron generator radiation detector is that these materials allow construction of a detector that is reliable, fast-acting, and operable in a downhole environment where temperatures can be 200° C. or higher. Yet another advantage is that the coincidence counting provides for more accurate data by having a higher signal to noise ratio and, thus, more accurate estimates of formation properties. Yet another advantage is the ability to determine the trajectory of neutrons emitted from the pulsed neutron generator.

In support of the teachings herein, various analysis components may be used, including a digital and/or an analog system. For example, the downhole electronics 11, the computer processing system 12, the coincidence counter 15, or the energy discriminator circuit may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates to a structural limitation of an apparatus that allows the apparatus to perform the task or function for which the apparatus is configured. One of ordinary skill in the art upon reading the teachings of the present disclosure would understand the required structural limitation.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property of an earth formation, the apparatus comprising:
   a pulsed neutron generator configured to emit a pulse of neutrons, the pulsed neutron generator being disposed on a carrier configured to be conveyed through a borehole penetrating the earth formation;

a formation radiation detector configured to detect radiation emitted from the formation due to interactions with the pulse of neutrons;

a neutron generator radiation detector comprising a crystal structure and configured to detect a radiation particle emitted from the pulsed neutron generator and to provide a location within the neutron radiation detector at which the particle was detected, the crystal structure comprising a plurality of detection cells, each detection cell comprising at least two electrically conducting columns with an applied potential difference such that electrons generated in the crystal structure by interaction with the radiation particle emitted by the pulse neutron generator are collected by at least one of the electrically conducting columns, wherein the detection cell detecting the radiation particle provides the location; and a processor configured to estimate the property using the radiation detected by the formation radiation detector and locations of radiation particles detected by the neutron generator radiation detector.

2. The apparatus according to claim 1, wherein the one or more conducting columns comprise graphite.

3. The apparatus according to claim 1, wherein the crystal structure comprises a single crystal structure.

4. The apparatus according to claim 3, wherein the single crystal structure comprises diamond.

5. The apparatus according to claim 1, wherein the crystal structure comprises a polycrystalline structure.

6. The apparatus according to claim 5, wherein the polycrystalline structure comprises diamond.

7. The apparatus according to claim 6, wherein the diamond comprises a diamond wafer.

8. The apparatus according to claim 1, wherein the neutron generator radiation detector is disposed within a vacuum tube housing neutron-generating components and is configured to detect an alpha particle that was emitted by the pulsed neutron generator with a neutron in the pulse of neutrons.

9. The apparatus according to claim 8, further comprising an energy discriminator coupled to the neutron generator radiation detector, the energy discriminator being configured to identify the alpha particle radiation by a level of energy of detected particles.

10. The apparatus according to claim 8, further comprising a coincidence counter coupled to the formation radiation detector and to the neutron generator radiation detector and configured to identify formation radiation counts that are detected by the formation radiation detector and are within a defined time interval that starts with detection of the alpha particle, wherein the processor is further configured to estimate the property using the radiation counts identified by the coincidence counter.

11. The apparatus according to claim 10, further comprising electronics coupled to the neutron generator radiation detector and configured to estimate a trajectory of a neutron emitted from the pulsed neutron generator using the detection location provided by the neutron generator radiation detector.

12. The apparatus according to claim 11, wherein the processor is further configured to not use formation radiation counts associated with the trajectory if the trajectory does not intersect with the formation in a region of interest.

13. The apparatus according to claim 8, wherein the neutron generator radiation detector at least partially surrounds the neutron-generating components.

14. The apparatus according to claim 1, wherein the neutron generator radiation detector is disposed outside of a vacuum tube housing neutron-generating components and is configured to detect neutron radiation.

15. The apparatus according to claim 14, where the neutron radiation detector at least partially surrounds pulsed neutron-generating components.

16. The apparatus according to claim 14, further comprising an energy discriminator coupled to the neutron generator radiation detector, the energy discriminator being configured to identify the neutron radiation by a level of energy of detected particles.

17. The apparatus according to claim 1, wherein the formation radiation detector is configured to detect gamma-rays.

18. The apparatus according to claim 1, wherein the formation radiation detector is configured to detect neutrons.

19. An apparatus for estimating a property of an earth formation, the apparatus comprising:

a pulsed neutron generator configured to emit a pulse of neutrons, the pulsed neutron generator being disposed on a carrier configured to be conveyed through a borehole penetrating the earth formation;

a formation radiation detector configured to detect radiation emitted from the formation due to interactions with the pulse of neutrons;

a neutron generator radiation detector comprising a crystal structure, and configured to detect a radiation particle emitted from the pulsed neutron generator and to provide a location within the neutron generator radiation detector at which the particle was detected, the crystal structure comprising a plurality of detection cells, each detection cell comprising at least two electrically conducting columns with an applied potential difference such that electrons generated in the crystal structure by interaction with the radiation particle emitted by the pulse neutron generator are collected by at least one of the electrically conducting columns, wherein the detection cell detecting the radiation particle provides the location;

a voltage source coupled to the at least two conducting columns and configured to apply the potential difference between the at least two conducting columns;

a coincidence counter coupled to the formation radiation detector and to the neutron generator radiation detector and configured to identify formation radiation counts that are detected by the formation radiation detector and are within a defined time interval that starts with detection of an associated radiation particle that was emitted by the pulsed neutron generator;

electronics coupled to the at least two conducting columns and configured to estimate a trajectory of neutrons emitted from the pulsed neutron generator; and a processor configured to estimate the property using the formation radiation counts identified by the coincidence counter and locations of radiation particles detected by the neutron generator radiation detector;

wherein the processor is further configured to not use formation radiation counts identified by the coincidence counter that are associated with the trajectory if the trajectory does not intersect with the formation in a region of interest.

20. A method for estimating a property of an earth formation, the method comprising:

conveying a carrier through a borehole penetrating the formation;

emitting a pulse of neutrons from a pulsed neutron generator disposed on the carrier;

detecting formation radiation emitted from the formation due to interactions with the pulse of neutrons using a formation radiation detector;

detecting radiation emitted from the pulsed neutron generator using a neutron generator radiation detector comprising a crystal structure and configured to detect a radiation particle emitted from the pulsed neutron generator and to provide a location within the neutron radiation detector at which the particle was detected, the crystal structure comprising a plurality of detection cells, each detection cell comprising at least two electrically conducting columns with an applied potential difference such that electrons generated in the crystal structure by interaction with the radiation particle emitted by the pulse neutron generator are collected by at least one of the electrically conducting columns, wherein the detection cell detecting the radiation particle provides the location;

identifying formation radiation counts detected by the formation radiation detector within a defined time interval that starts with detection of an associated radiation particle that was emitted by the pulsed neutron generator along with a neutron using a coincidence counter; and estimating, using a processor, the property using the formation radiation counts identified by the coincidence counter and locations of radiation particles detected by the neutron generator radiation detector.

21. The method according to claim 20, wherein the radiation comprises an alpha particle and the method further comprises estimating a trajectory of a neutron emitted from the pulsed neutron generator by identifying the detection cell that detected the alpha particle that was emitted with the neutron by the pulsed neutron generator.

22. The method according to claim 21, further comprising not using formation radiation counts identified by the coincidence counter that are associated with the trajectory if the trajectory does not intersect with the formation in a region of interest.

* * * * *